United States Patent
Chen et al.

(10) Patent No.: US 11,936,238 B2
(45) Date of Patent: Mar. 19, 2024

(54) UNINTERRUPTIBLE POWER APPARATUS AND MAGNETIC FLUX COMPENSATION METHOD THEREOF

(71) Applicant: DELTA ELECTRONICS, INC., Taoyuan (TW)

(72) Inventors: Hsin-Chih Chen, Taoyuan (TW); Hung-Chieh Lin, Taoyuan (TW); Chao-Lung Kuo, Taoyuan (TW); Yi-Ping Hsieh, Taoyuan (TW); Chien-Shien Lee, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 17/840,714

(22) Filed: Jun. 15, 2022

(65) Prior Publication Data
US 2023/0261516 A1    Aug. 17, 2023

(30) Foreign Application Priority Data
Feb. 16, 2022   (CN) .......................... 202210141922.9

(51) Int. Cl.
*H02J 9/06* (2006.01)
*H03K 17/082* (2006.01)

(52) U.S. Cl.
CPC .................................... *H02J 9/062* (2013.01)

(58) Field of Classification Search
CPC ........ H02J 9/062; H02J 3/0012; H02J 7/0031; H02J 7/00711; H02M 5/42
USPC .......................................................... 307/64
See application file for complete search history.

(56) References Cited

U.S. PATENT DOCUMENTS

| | | | |
|---|---|---|---|
| 11,165,419 B2 | 11/2021 | Nakano et al. | |
| 2018/0076659 A1* | 3/2018 | Giuntini | .................. H02J 9/062 |
| 2021/0036698 A1* | 2/2021 | Nakano | .............. H03K 17/0824 |

FOREIGN PATENT DOCUMENTS

| | | |
|---|---|---|
| CN | 112653229 A | 4/2021 |
| KR | 20100104006 A | 9/2010 |
| TW | 201112582 A | 4/2011 |

OTHER PUBLICATIONS

Search Report dated Dec. 5, 2022 of the corresponding European patent application No. 22177941.6.

* cited by examiner

*Primary Examiner* — Daniel Cavallari
*Assistant Examiner* — Xuan Ly
(74) *Attorney, Agent, or Firm* — MUNCY, GEISSLER, OLDS & LOWE, P.C.

(57) ABSTRACT

An uninterruptible power apparatus is coupled between a power grid and a load. The uninterruptible power apparatus includes a bypass path, a power conversion module, and a control module. The bypass path is coupled to the power grid through a grid terminal, and coupled to the load through a load terminal. The control module turns off a first thyristor and a second thyristor by injecting a second voltage into the load terminal during a forced commutation period. The control module calculates a magnetic flux offset amount based on an error amount between the second voltage and a voltage command, and provides a compensation command in response to the magnetic flux offset amount. The control module controls the DC/AC conversion circuit to provide a third voltage to the load terminal based on the compensation command and the voltage command.

13 Claims, 11 Drawing Sheets

UNINTERRUPTIBLE POWER APPARATUS AND MAGNETIC FLUX COMPENSATION METHOD THEREOF

BACKGROUND

Technical Field

The present disclosure relates to an uninterruptible power apparatus and a magnetic flux compensation method thereof, and more particularly to an uninterruptible power apparatus with a magnetic flux compensation and a magnetic flux compensation method thereof.

Description of Related Art

The statements in this section merely provide background information related to the present disclosure and do not necessarily constitute prior art.

Figure 1A:
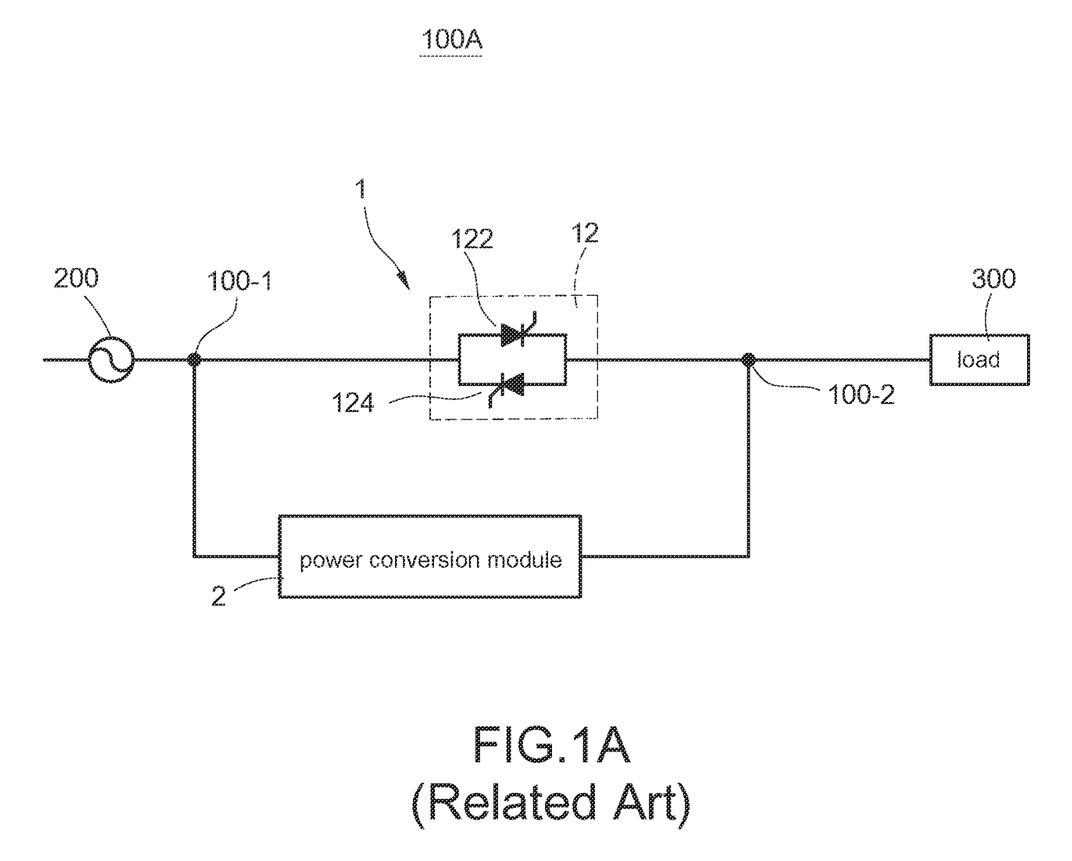
FIG. 1A is a block circuit diagram of a conventional uninterruptible power apparatus.

Due to the increasing popularity of key electronic systems (such as servers, central control systems, etc.) in the current electronic system field, more and more attention has been paid to the continuity and stability of power supply. Most of today's solutions add uninterruptible power apparatus to meet the needs of critical electronic systems. Taking the conventional uninterruptible power apparatus 100A in FIG. 1A as an example, the uninterruptible power apparatus 100A includes a bypass path 1 and a power conversion module 2, and the power conversion module 2 is connected in parallel with the bypass path 1. The bypass path 1 includes a switch unit 12, and the switch unit 12 includes a first thyristor 122 and a second thyristor 124 connected in antiparallel. The voltage provided by a power grid 200 passes through the grid terminal 100-1 and the switch unit 12 to the load terminal 100-2 to supply power to the load 300. When the power grid 200 fails, the uninterruptible power apparatus 100A turns off the switch unit 12, and controls the power conversion module 2 to provide backup power to the load 300.

Figure 1B:
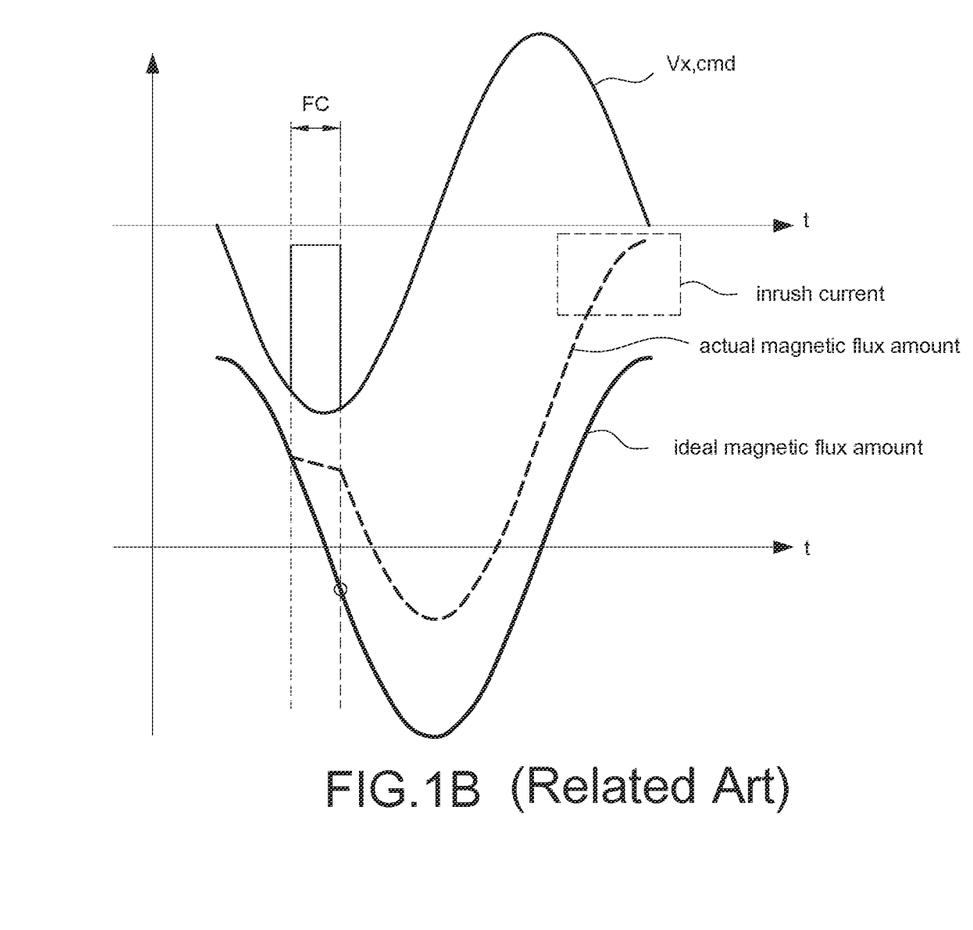
FIG. 1B is a schematic diagram of a magnetic flux offset.

However, due to the switching characteristics of the thyristor, when there is a current passing through, the switching unit 12 cannot be turned off by the control signal. Therefore, a reverse voltage must be applied to the load terminal 100-2 during a forced commutation period (FC) by the uninterruptible power apparatus 100A when the uninterruptible power apparatus 100A switches the power conversion module 2 to supply the power so that the first thyristor 122 and the second thyristor 124 are quickly turned off. However, under a transformer provided inside the load 300 as shown in FIG. 1B, the reverse voltage is applied to the load terminal 100-2 during the forced commutation period (FC), the magnetic flux of the transformer is shifted to generate an inrush current, which triggers the overcurrent protection mechanism and causes the voltage supplied by the uninterruptible power apparatus 100A to the load 300 being abnormal.

Therefore, the present disclosure provides an uninterruptible power apparatus with magnetic flux compensation and a magnetic flux compensation method to maintain the magnetic flux balance and avoid the overcurrent protection mechanism of the power conversion module triggered by the excessive inrush current.

SUMMARY

In order to solve the above-mentioned problems, the present disclosure provides an uninterruptible power apparatus. The uninterruptible power apparatus is coupled between a power grid and a load. The uninterruptible power apparatus includes a bypass path, a power conversion module, and a control module. The bypass path is coupled to the power grid through a grid terminal, and is coupled to the load through a load terminal, and receives a first voltage through the grid terminal and transmits the first voltage to the load terminal. The bypass path includes a switch unit. The switch unit includes a first thyristor and a second thyristor connected in anti-parallel. The power conversion module includes an AC/DC conversion circuit and a DC/AC conversion circuit. The AC/DC conversion circuit is coupled to the grid terminal. The DC/AC conversion circuit is coupled to the AC/DC conversion circuit and the load terminal. The control module is coupled to the DC/AC conversion circuit. The control module turns off the first thyristor and the second thyristor by injecting a second voltage into the load terminal during a forced commutation period. The control module calculates a magnetic flux offset amount based on an error amount between the second voltage and a voltage command, and provides a compensation command in response to the magnetic flux offset amount. The control module controls the DC/AC conversion circuit to provide a third voltage to the load terminal based on the compensation command and the voltage command.

In order to solve the above-mentioned problems, the present disclosure provides a magnetic flux compensation method of an uninterruptible power apparatus. The uninterruptible power apparatus is coupled between a power grid and a load. The uninterruptible power apparatus includes a bypass path and a power conversion module. The bypass path is coupled to the power grid and the load. The bypass path includes a switch unit, and the switch unit includes a first thyristor and a second thyristor connected in anti-parallel. The bypass path receives a first voltage provided by the power grid through a grid terminal, and transmits the first voltage to a load terminal coupled to the load. The method includes steps of: (a) realizing that the first voltage is abnormal, (b) turning off the first thyristor and the second thyristor by injecting a second voltage into the load terminal based on the abnormality of the first voltage during a forced commutation period, (c) calculating a magnetic flux offset amount based on an error amount between the second voltage and a voltage command, and calculating a compensation amount based on the magnetic flux offset amount, and (d) providing a compensation command corresponding to the compensation amount so as to control a DC/AC conversion circuit of the power conversion module based on the compensation command and the voltage command to provide a third voltage to the load terminal.

The main purpose and effect of the present disclosure is that the control module detects and records the magnetic flux offset amount of a voltage at the load terminal during the forced commutation period. After the thyristors are successfully turned off, the third voltage outputted by the DC/AC conversion circuit is adjusted to compensate the magnetic flux so as to maintain the magnetic flux balance and suppress the large current.

It is to be understood that both the foregoing general description and the following detailed description are exemplary, and are intended to provide further explanation of the present disclosure as claimed. Other advantages and features of the present disclosure will be apparent from the following description, drawings, and claims.

BRIEF DESCRIPTION OF DRAWINGS

The present disclosure can be more fully understood by reading the following detailed description of the embodiment, with reference made to the accompanying drawing as follows.

DETAILED DESCRIPTION

Reference will now be made to the drawing figures to describe the present disclosure in detail. It will be understood that the drawing figures and exemplified embodiments of present disclosure are not limited to the details thereof.

Figure 2A:
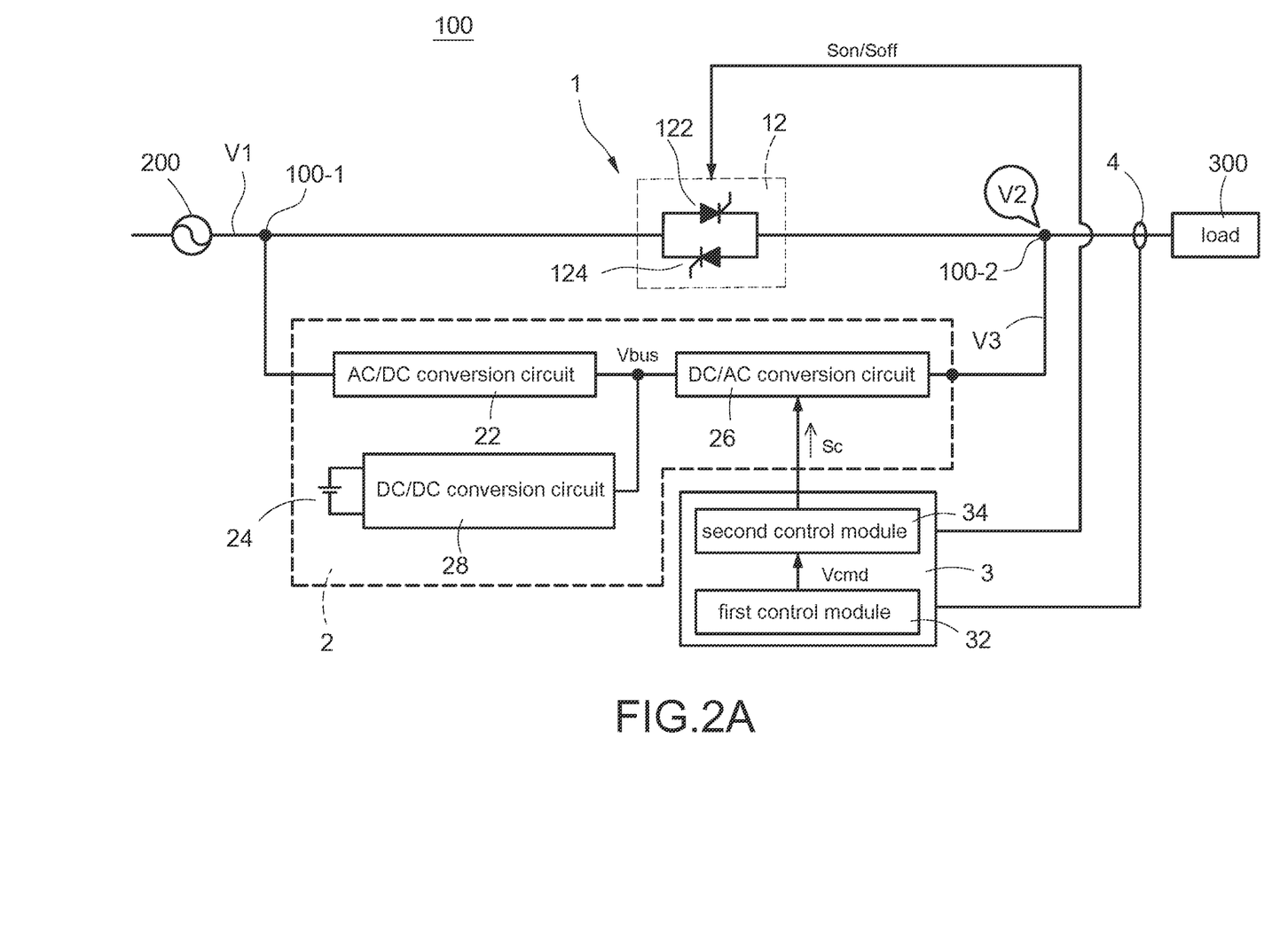
FIG. 2A is a block circuit diagram of an uninterruptible power apparatus with magnetic flux compensation according to a first embodiment of the present disclosure.

Please refer to FIG. 2A, which shows a block circuit diagram of an uninterruptible power apparatus with magnetic flux compensation according to a first embodiment of the present disclosure, and also refer to FIG. 1. In this embodiment, the uninterruptible power apparatus 100 is configured in a single-phase system. The uninterruptible power apparatus 100 is coupled between a power grid 200 and a load 300, and the uninterruptible power apparatus 100 includes a grid terminal 100-1 and a load terminal 100-2. The grid terminal 100-1 is coupled to the power grid 200, and receives a first voltage V1 provided by the power grid 200. The load terminal 100-2 is coupled to the load 300, and supplies power electricity to the load 300 to maintain the load 300 stable and normal operation. The uninterruptible power apparatus 100 further includes a bypass path 1, at least one power conversion module 2 (one is shown in FIG. 2A), and a control module 3. One end of the bypass path 1 is coupled to the power grid 200 through the grid terminal 100-1, and the other end of the bypass path 1 is coupled to the load 300 through the load terminal 100-2. The bypass path 1 includes a switch unit 12, and the switch unit 12 is connected in series on the bypass path 1. The switch unit 12 includes a first thyristor 122 and a second thyristor 124, and the first thyristor 122 and the second thyristor 124 are connected in anti-parallel. The bypass path 1 receives the first voltage V1 through the grid terminal 100-1, and transmits the first voltage V1 to the load terminal 100-2 through the switch unit 12 to supply power to the load 300 at the load terminal 100-2.

The power conversion module 2 is coupled to the grid terminal 100-1 and the load terminal 100-2, and converts the first voltage V1 into a third voltage V3 and supplies power to the load 300. Specifically, the power conversion module 2 includes an AC/DC conversion circuit 22, an energy storage unit 24, and a DC/AC conversion circuit 26. The AC/DC conversion circuit 22 is coupled to the grid terminal 100-1, and converts the first voltage V1 into a DC bus voltage Vbus. The DC/AC conversion circuit 26 is coupled to the AC/DC conversion circuit 22, the energy storage unit 24 and the load terminal 100-2, and converts the DC bus voltage Vbus into the third voltage V3. The power conversion module 2 further includes a DC/DC conversion circuit 28, and the DC/DC conversion circuit 28 is coupled between the AC/DC conversion circuit 22, the energy storage unit 24, and the DC/AC conversion circuit 26. The DC/DC conversion circuit 28 converts a voltage stored in the energy storage unit 24 into the DC bus voltage Vbus so that the converted DC bus voltage Vbus is suitable for the DC/AC conversion circuit 26 to generate the third voltage V3.

The control module 3 is coupled to the DC/AC conversion circuit 26 and the switch unit 12. According to a detected voltage and/or a detected current at the load terminal 100-2 by a detection unit 4, the control module 3 controls (turns on/turns off) the switch unit 12, and provides a control signal Sc, for example, but not limited to a PWM signal to control the DC/AC conversion circuit 26 to generate the third voltage V3. Specifically, the control module 3 determines or realizes whether the first voltage V1 is abnormal or not by detecting the grid terminal 100-1, or by receiving detection signals provided from external devices (not shown). In one embodiment, the control module 3 includes a plurality of microprocessors, and therefore the control module 3 controls not only the DC/AC conversion circuit 26 and the switch unit 12, but also other circuits of the uninterruptible power apparatus 100, for example, but not limited to the AC/DC conversion circuit 22, the DC/DC conversion circuit 28, etc. In particular, the control module 3 and the power conversion module 2 may be arranged/installed in the same casing or different casings, and the control module 3 and the power conversion module 2 can be arranged in the same casing or belong to different casings, and their installation positions are not limited.

When the first voltage V1 is normal, the uninterruptible power apparatus 100 operates in a high-efficiency mode. The control module 3 provides a turned-on signal Son to turn on the switch unit 12 (i.e., turn on the first thyristor 122 and the second thyristor 124) so that the first voltage V1 passes through the bypass path 1 and supplies power to the load 300. In this condition, the control module 3 can control the power conversion module 2 to stand by and not operate, or the control module 3 can control the power conversion module 2 to perform a harmonic compensation on the load 300.

When the first voltage V1 is abnormal, the DC/AC conversion circuit 26 performs the operation of forcibly disconnecting (turning off) the path of the uninterruptible power apparatus 100, and after the path is forcibly disconnected, the control module 3 controls the DC/AC conversion circuit 26 to provide the third voltage V3 to supply power to the load 300. Moreover, due to the characteristics of the thyristor, when there is still a current flowing through the thyristor, the thyristor cannot be quickly turned off by the control signal. When the first voltage V1 is abnormal, the control module 3 first provides a turned-off signal Soff to the first thyristor 122 and the second thyristor 124 to ensure that the thyristors are no longer triggered. Further, the uninterruptible power apparatus 100 is controlled to inject/provide the second voltage V2 into the load terminal 100-2 so as to provide a reverse-biased voltage to the unturned-off thyristors and quickly turn off the thyristors. The period during which the thyristor is turned off is referred to as a forced commutation period in the present disclosure, and the second voltage V2 injected into the load terminal 100-2 may be provided by the control module 3 to control an additional auxiliary circuit (not shown), or provided by the control module 3 to control the DC/AC conversion circuit 26.

After the above-mentioned forced commutation period, both the first thyristor 122 and the second thyristor 124 are turned off, and the power conversion module 2 operates in an uninterrupted power supply mode, that is, the third voltage V3 provided by the power conversion module 2 provides backup power to the load 300. In one embodiment, the first voltage V1 can normally represent that the voltage amplitude, phase, and frequency of the AC voltage are within a predetermined range that meets the specifications. Although it may be slightly tolerant of some harmonic distortion or amplitude instability, it still meets the criteria required for operation of the load 300. On the other hand, the abnormality of the first voltage V1 means that the voltage amplitude, phase, and frequency of the AC voltage do not meet the specifications, which may occur since the power grid 200 is not stable enough, the components are poorly connected, the harmonic distortion is too large, or the power grid 200 is disconnected caused by electricity interruption.

Since the second voltage V2 injected into the load terminal 100-2 during the forced commutation period is to quickly turn off the thyristors, it is easy to cause the phenomenon that the magnetic flux offset occurs in the transformer inside the rear-stage load 300. This phenomenon will cause the transformer to saturate and generate inrush current, which may trigger the overcurrent protection mechanism of the uninterruptible power apparatus 100. Therefore, the main purpose and effect of the present disclosure is that the control module 3 detects and records the magnetic flux offset of the voltage of the load terminal 100-2 during the forced commutation period (i.e., the period during which the second voltage V2 is injected). After the thyristors are successfully turned off, the magnetic flux is compensated (i.e., the third voltage V3 outputted by the DC/AC conversion circuit 26 is adjusted to compensate the magnetic flux) to maintain the magnetic flux balance so as to suppress the inrush current.

Specifically, the control module 3 includes a first control module 32 and a second control module 34. The first control module 32 is coupled to the load terminal 100-2, and the second control module 34 is coupled to the DC/AC conversion circuit 26 and the first control module 32. The first control module 32 calculates the magnetic flux offset during the forced commutation period based on an error amount between the second voltage V2 and a voltage command. The first control module 32 calculates the compensation amount based on the magnetic flux offset to provide a compensation command Vcmd corresponding to the compensation amount. The second control module 34 modulates the control signal Sc based on the compensation command Vcmd and the voltage command so as to control the DC/AC conversion circuit 26 through the control signal Sc. In particular, the first control module 32 and the second control module 34 are only for the convenience of illustrating the control method of the present disclosure, and it does not mean that the first control module 32 and the second control module 34 must be separate modules, nor is it limited to be composed of circuit elements. In one embodiment, the functions of the first control module 32 and the second control module 34 are implemented by a microprocessor in cooperation with corresponding programs.

After the control module 3 provides the turned-off signal Soff to the first thyristor 122 and the second thyristor 124, the uninterruptible power apparatus 100 injects the second voltage V2 into the load terminal 100-2. During the forced commutation period when the second voltage V2 is injected, the control module 3 calculates the magnetic flux offset based on the error amount between the second voltage V2 and the voltage command. After the thyristors are turned off, the control module 3 provides the compensation command Vcmd in response to the magnetic flux offset. The control module 3 provides the control signal Sc to the DC/AC conversion circuit 26 based on the compensation command Vcmd so as to control the DC/AC conversion circuit 26 to provide the third voltage V3 to the load terminal 100-2 to compensate the magnetic flux offset and avoid saturation of the transformer.

Since the voltage command is usually a sinusoid wave command (fundamental frequency), the control module 3 automatically detects the first voltage V1 to acquire the phase of the first voltage V1 by the detection unit 4 when the first voltage V1 is normal (i.e., when the first thyristor 122 and the second thyristor 124 are turned on) so as to generate the voltage command in the same phase with the first voltage V1, or the voltage command may be generated by the control module 3 (if the phase may be different from the first voltage V1). Even if the first voltage V1 is abnormal, the voltage command is still not disturbed by the abnormal first voltage V1, and the sinusoid wave command is still maintained. The purpose of the voltage command is that when the uninterruptible power apparatus 100 operates in the uninterruptible power supply mode (i.e., the power conversion module 2 supplies power to the load 300), the control module 3 controls the DC/AC conversion circuit 26 controls the DC/AC conversion circuit 26 to provide the third voltage V3 based on the voltage command.

Figure 2B:
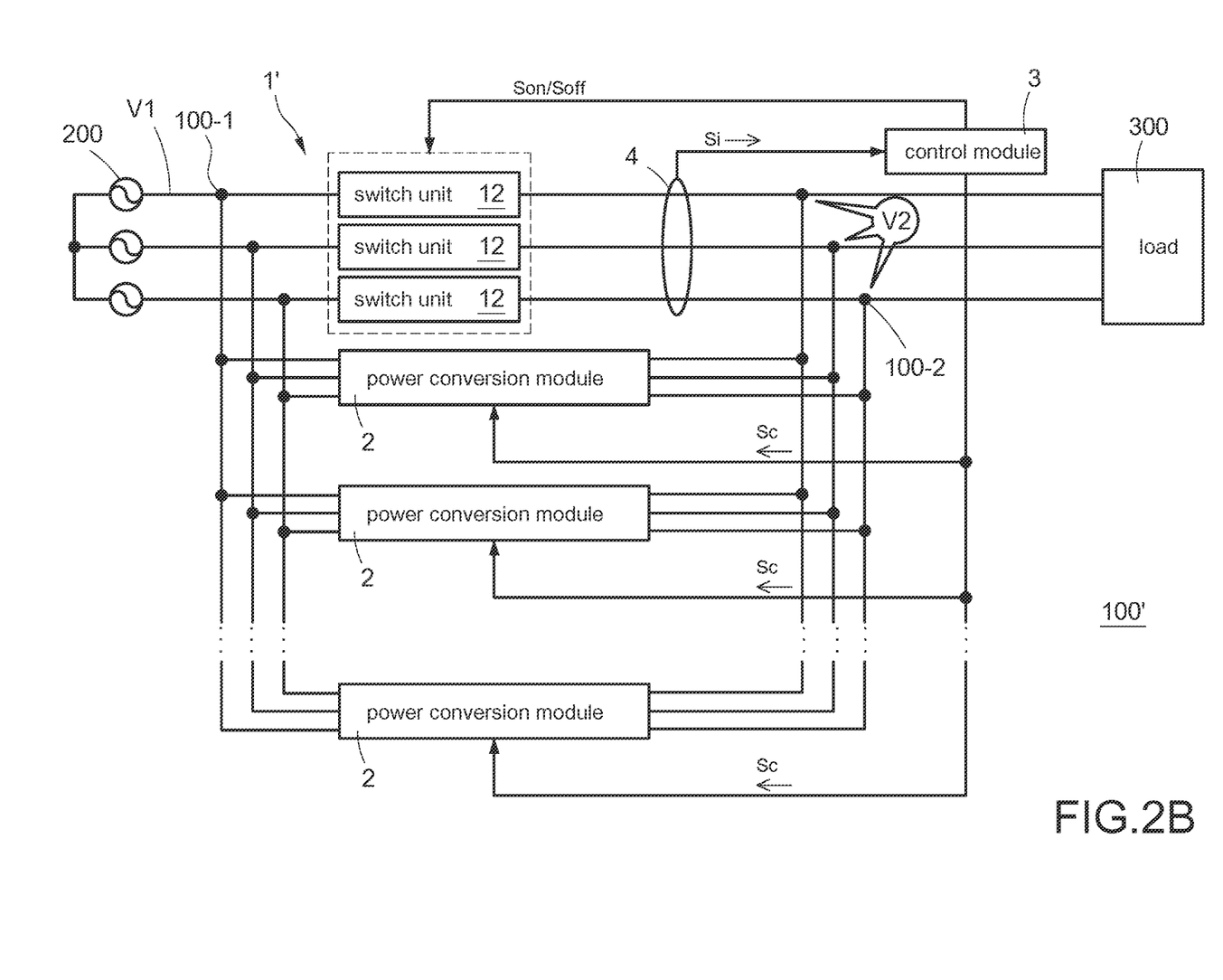
FIG. 2B is a block circuit diagram of the uninterruptible power apparatus with magnetic flux compensation according to a second embodiment of the present disclosure.

Please refer to FIG. 2B, which shows a block circuit diagram of the uninterruptible power apparatus with magnetic flux compensation according to a second embodiment of the present disclosure, and also refer to FIG. 2A. The difference between the uninterruptible power apparatus 100' shown in FIG. 2B and the uninterruptible power apparatus 100 shown in FIG. 2A is that the uninterruptible power apparatus 100' is configured in a three-phase system. The bypass path 1' incudes three sets of switch units 12, and each power conversion module 2' has three-phase input, three-phase output, and the control module 3' controls the uninterruptible power apparatus 100' based on whether the first voltage V1 is normal or not. In particular, the detailed structure and the control method of the uninterruptible power apparatus 100' shown in FIG. 2B may be referred to in conjunction with FIG. 2A, and the detail description is omitted here for conciseness.

Figure 3A:
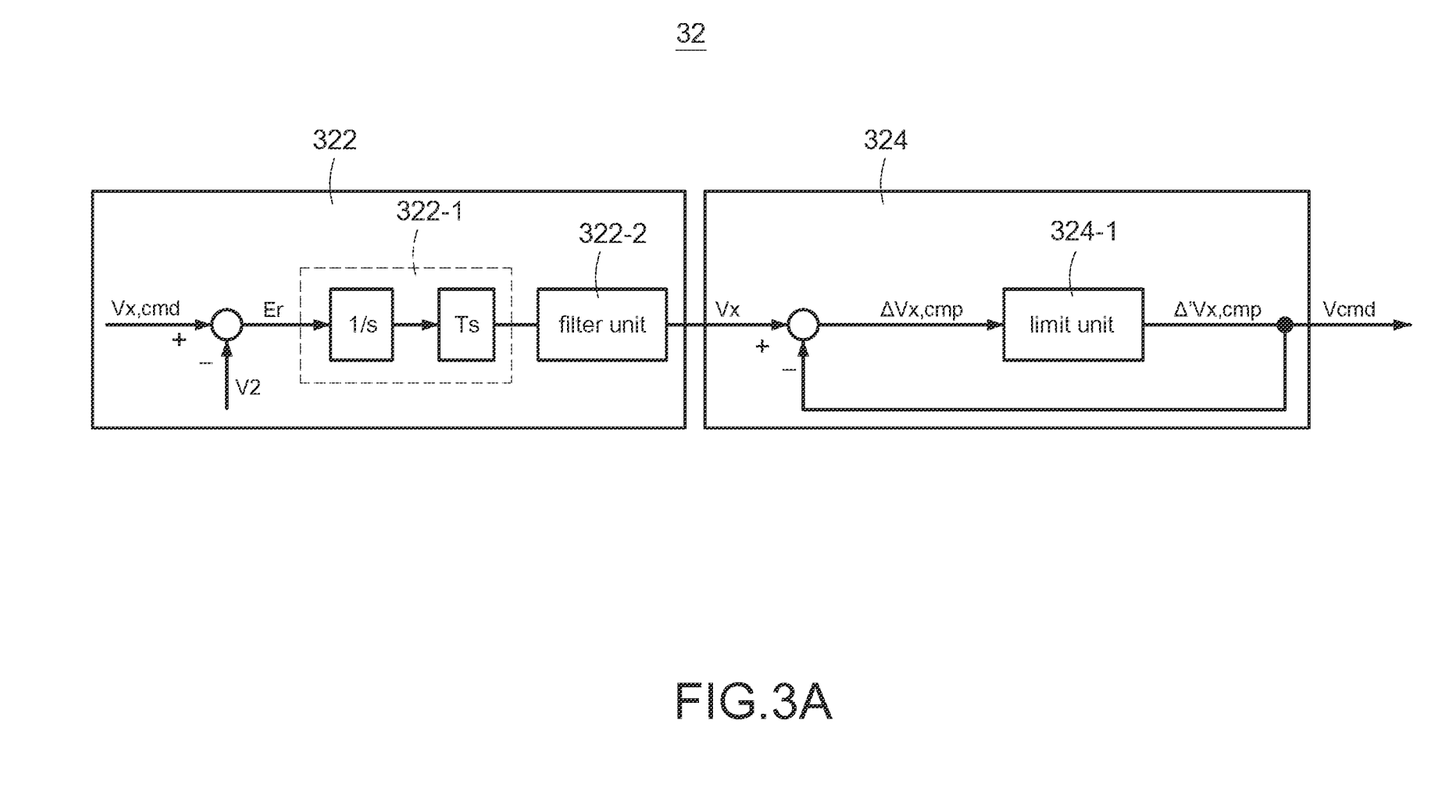
FIG. 3A is a block diagram of a first control module according to a first embodiment of the present disclosure.

Please refer to FIG. 3A, which shows a block diagram of a first control module according to a first embodiment of the present disclosure, and also refer to FIG. 2A and FIG. 2B. In this embodiment, the DC/AC conversion circuit 26 is a single-phase output circuit. The first control module 32 includes a first control unit 322 and a second control unit 324, and the first control unit 322 includes an integral unit 322-1. During the forced commutation period, the first control unit 322 generates an error amount Er based on the second voltage V2 and the voltage command Vx, cmd. The integral unit 322-1 receives the error amount Er and integrates the error amount Er to achieve the purpose of accumulation. Since the magnetic flux is the integral of the voltage, after the error amount Er is integrated by the integral unit 322-1, the magnetic flux offset amount Vx can be acquired. In particular, the magnetic flux offset amount Vx can be considered as the total flux offset during the forced commutation period. Optionally, the first control unit 322 further includes a filter unit 322-2, and the filter unit 322-2 may be a low-pass filter (LPF) in one embodiment. The filter unit 322-2 is coupled to the integral unit 322-1 and the second control unit 324, and filters the noise generated by a sampling operation.

When the forced commutation period ends, the uninterruptible power apparatus 100 will operate in the uninterruptible power supply mode, that is, the power conversion module 2 starts to supply power to the load 300. In this condition, the second control unit 324 receives the magnetic flux offset amount Vx, and provides the compensation command Vcmd in response to the magnetic flux offset amount Vx. Specifically, the second control unit 324 includes a limit unit 324-1, and the limit unit 324-1 receives the magnetic flux offset amount Vx to limit the output of the compensation command Vcmd. Since the magnetic flux compensation will cause a certain degree of voltage distortion (i.e., the third voltage V3 is distorted), if the compensation amount is too large, the third voltage V3 will be too distorted, which may adversely affect the load 300. Therefore, the first control module 32 uses the limit unit 324-1 to avoid overcompensation. Specifically, the second control unit 324 generates the residual compensation amount $\Delta$Vx, cmp based on the magnetic flux offset amount Vx and the compensation amount $\Delta$'Vx, cmp. The limit unit 324-1 limits the compensation amount to the residual compensation amount $\Delta$Vx, cmp to provide the compensation amount $\Delta$'Vx, cmp, and the second control unit 324 provides the compensation command Vcmd to the second control module 34 based on the compensation amount $\Delta$'Vx, cmp. The second control module 34 modulates the control signal Sc based on the compensation command Vcmd and the voltage command Vx, cmd to demagnetize the transformer inside the rear-stage load 300 by superimposing the compensated voltage on the sinusoid wave voltage to avoid saturation.

In other words, after the second control unit 324 acquires the magnetic flux offset amount Vx, the second control unit 324 acquires the actual compensation amount (i.e., the compensation amount $\Delta$'Vx, cmp) through the limit unit 324-1. Afterward, after deducting the actual compensation amount from the magnetic flux offset amount Vx, the remaining uncompensated amount is acquired (i.e., the residual compensation amount $\Delta$Vx, cmp). Therefore, after several operation loops, the offset amount can be gradually compensated. For example, it is assumed that the limit unit 324-1 sets the compensated amount (i.e., the amount that can be compensated) by one loop to be 10, and the first control unit 322 calculates the magnetic flux offset amount Vx during the forced commutation period to be 45. Therefore, after the magnetic flux offset amount Vx is limited by the limit unit 324-1, the actual compensation amount that can be provided is 10, and after the magnetic flux offset amount Vx deducts the actual compensation amount (10) of the current loop, the remaining uncompensated amount (i.e., the residual compensation amount $\Delta$Vx, cmp) is 35. Therefore, after several operation loops, the residual compensation amount $\Delta$Vx, cmp (35) is gradually compensated to zero.

Figure 3B:
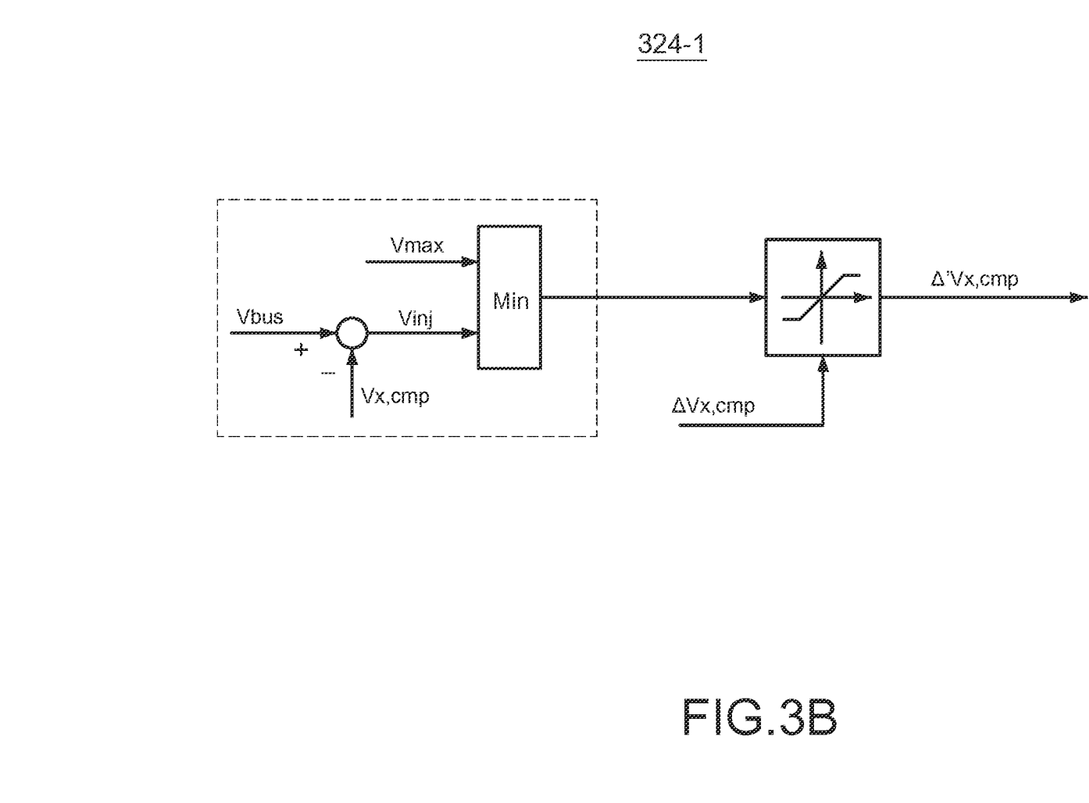
FIG. 3B is a block diagram of a limit unit according to a first embodiment of the present disclosure.

Please refer to FIG. 3B, which shows a block diagram of a limit unit according to a first embodiment of the present disclosure, and also refer to FIG. 2A to FIG. 3A. The limit unit 324-1 mainly limits the compensated amount (i.e., the amount that can be compensated) by setting the maximum compensation amount Vmax and the calculation of the injection amount Vinj. The residual compensation amount $\Delta$Vx, cmp is limited to the compensation amount $\Delta$'Vx, cmp by the limit unit 324-1 so as to avoid voltage distortion caused by excessive compensation at one time. Furthermore, the maximum compensation amount Vmax may be a user-defined value, and the injection amount Vinj is mainly the error amount between the DC bus voltage Vbus and the voltage command Vx, cmd to avoid over-modulation, and the smaller value of the two is the limit value of the limit unit 324-1 to limit the residual compensation amount $\Delta$Vx, cmp.

Figure 3C:
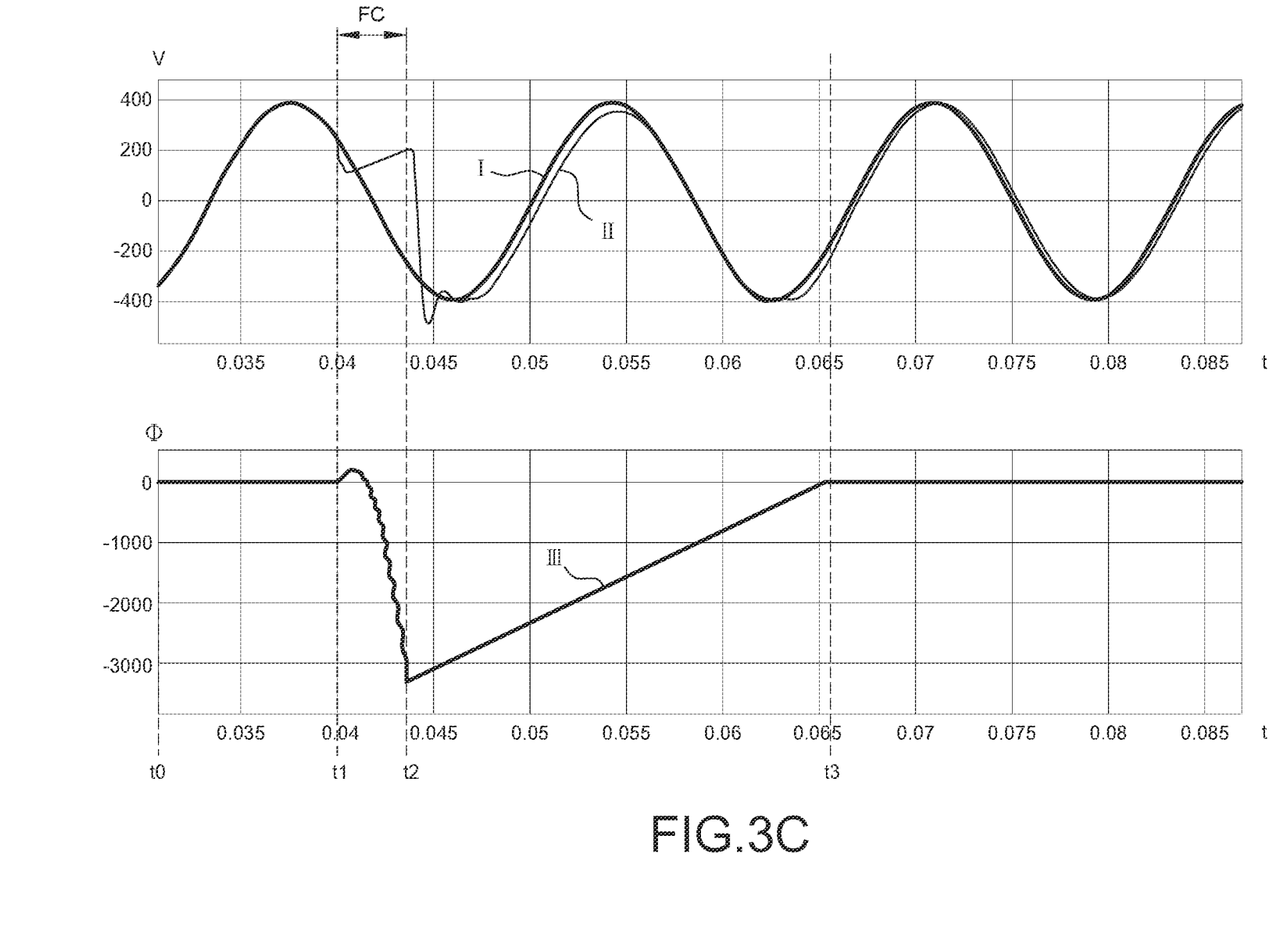
FIG. 3C is a schematic compensation waveform of the uninterruptible power apparatus according to a first embodiment of the present disclosure.

Please refer to FIG. 3C, which shows a schematic compensation waveform of the uninterruptible power apparatus according to a first embodiment of the present disclosure, and also refer to FIG. 2A to FIG. 3B. In this embodiment, the compensation waveform of the single-phase uninterruptible power apparatus 100 is shown. The waveform I is the voltage command Vx, cmd, the waveform II is the voltage waveform detected by the load terminal 100-2, and the waveform III is a schematic diagram of the magnetic flux compensation change. From time t0 to time t1, the first voltage V1 is normal, so the voltage waveform detected by the load terminal 100-2 is the first voltage V1. From time t1 to time t2, it is assumed that the first voltage V1 is abnormal, so the uninterruptible power apparatus 100 enters the forced commutation period FC. In this condition, the control module 3 controls the DC/AC conversion circuit 26 to output the second voltage V2 to the load terminal 100-2 for forced commutation. In order to quickly turn off the first thyristor 122 and the second thyristor 124, the voltage waveform of the load terminal 100-2 is not a sinusoid wave voltage, but is the second voltage V2. Therefore, from time t1 to time t2, the first control unit 322 calculates the magnetic flux offset. From the waveform III, it can be realized that the magnetic flux change generated by the accumulation of the error difference between the second voltage V2 and the voltage command Vx, cmd. After time t2, the thyristors are both completely turned off. The control module 3 controls the DC/AC conversion circuit 26 to provide the third voltage V3, and the second control unit 324 compensates for the magnetic flux offset during the forced commutation period FC. Therefore, it can be clearly seen that the magnetic flux gradually compensates to zero. Since the limit unit 324-1 limits the compensation amount, even if the waveform distortion caused by the injection of the second voltage V2 is severe, the third voltage V3 is only slightly different from the waveform of the voltage command Vx, cmd, and is still roughly similar to the sinusoid wave. Until the time t3, the magnetic flux has been compensated, and the third voltage V3 is restored to be the same as the voltage command Vx, cmd.

Figure 4A:
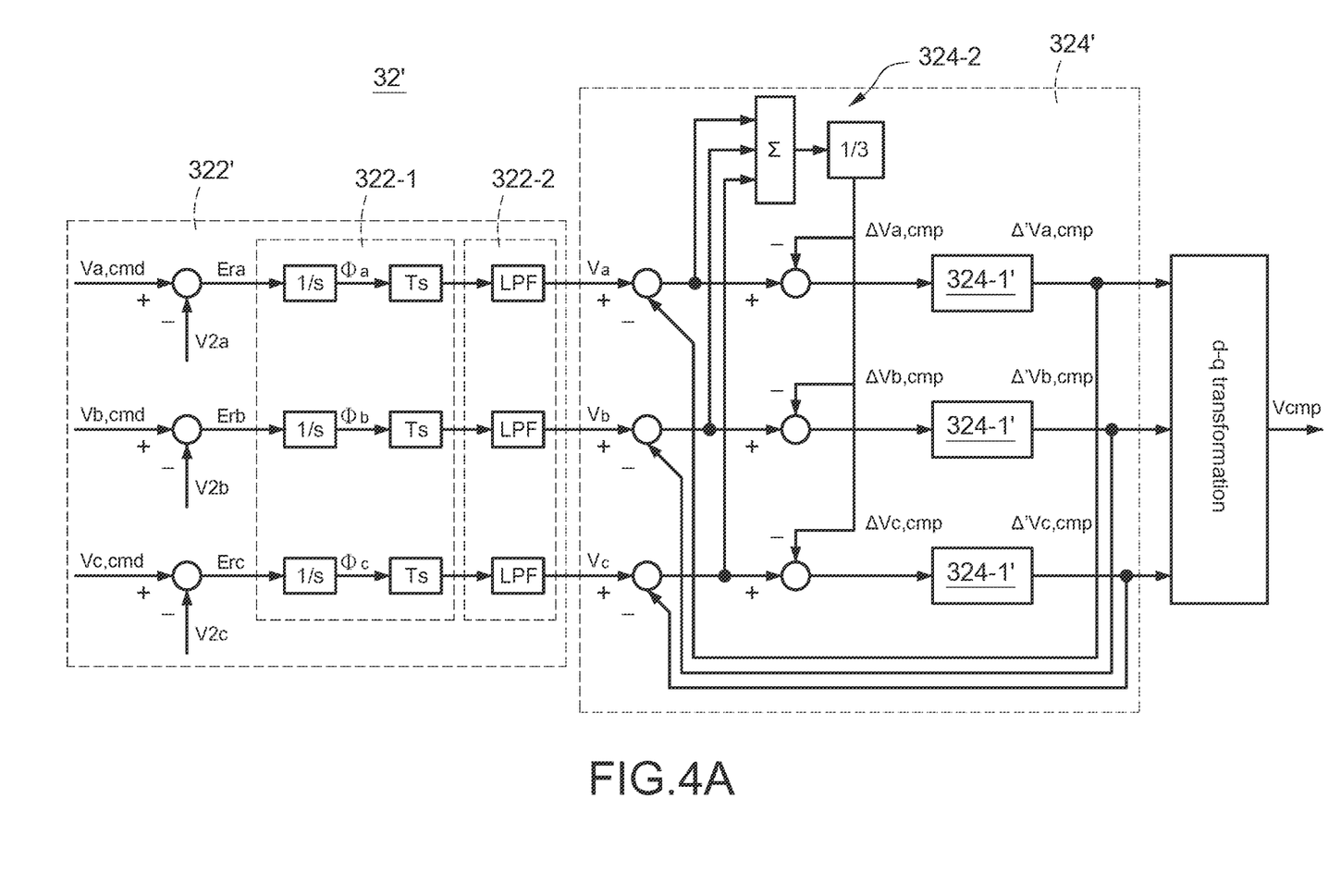
FIG. 4A is a block diagram of the first control module according to a second embodiment of the present disclosure.

Please refer to FIG. 4A, which shows a block diagram of the first control module according to a second embodiment of the present disclosure, and also refer to FIG. 2A to FIG. 3C. In this embodiment, The DC/AC conversion circuit 26' is a three-phase output circuit. The first control unit 322' of the first control module 32' generates error amount Era-Erc of each phase based on the second voltage V2a-V2c of each phase and the voltage commands Va, cmd-Vc, cmd. After integrating the error amount Era-Erc by the integral unit 322-1, the magnetic flux offset amount Va-Vc of each phase can be acquired. The second control unit 324' includes a limit unit 324-1' and a zero-sequence balance unit 324-2. The second control unit 324' generates the residual compensation amounts ΔVa, cmp-ΔVc, cmp based on the magnetic flux offset amounts Va-Vc and the compensation amounts Δ'Va, cmp-Δ'Vc, cmp. The zero-sequence balance unit 324-2 deducts the zero-sequence component of the residual compensation amount ΔVa, cmp-ΔVc, cmp of each phase so as to deduct the invalid zero-sequence component. Specifically, since the DC/AC conversion circuit 26' is a three-phase output circuit, the three-phase parameters under ideal conditions are all symmetrical. However, due to the difference of three-phase loading, three-phase circuit, and power supply, it is generally in asymmetrical operation. Therefore, when analyzing the asymmetric three-phase output, it can be decomposed into positive-sequence components, negative-sequence components, and zero-sequence component by the symmetrical component method. Since the zero-sequence component belongs to three components of the same amplitude and phase, if the zero-sequence component is not deducted, the compensation for this component is invalid.

The limit unit 324-1' limits the compensation amount for the residual compensation amount ΔVa, cmp-ΔVc, cmp of each phase and provides the compensation amount Δ'Va, cmp-Δ'Vc, cmp for each phase so as to correspondingly provide the compensation command Vcmd to the second control module 34'. For the convenience of control, the second control unit 324' may generate the compensation command Vcmd by performing d-q coordinate conversion on the compensation amount Δ'Va, cmp-Δ'Vc, cmp of each phase. The second control module 34' modulates the control signal Sc based on the compensation command Vcmd and the voltage commands Va, cmd-Vc, cmd to superimpose the compensated voltage on the original sinusoid wave voltage. In particular, the second control module 34, 34' may be a pulse-width modulation (PWM) controller known to those in the art, and generates a corresponding pulse-width modulation (PWM) signal according to the voltage command, and the detail description is omitted here for conciseness.

Figure 4B:
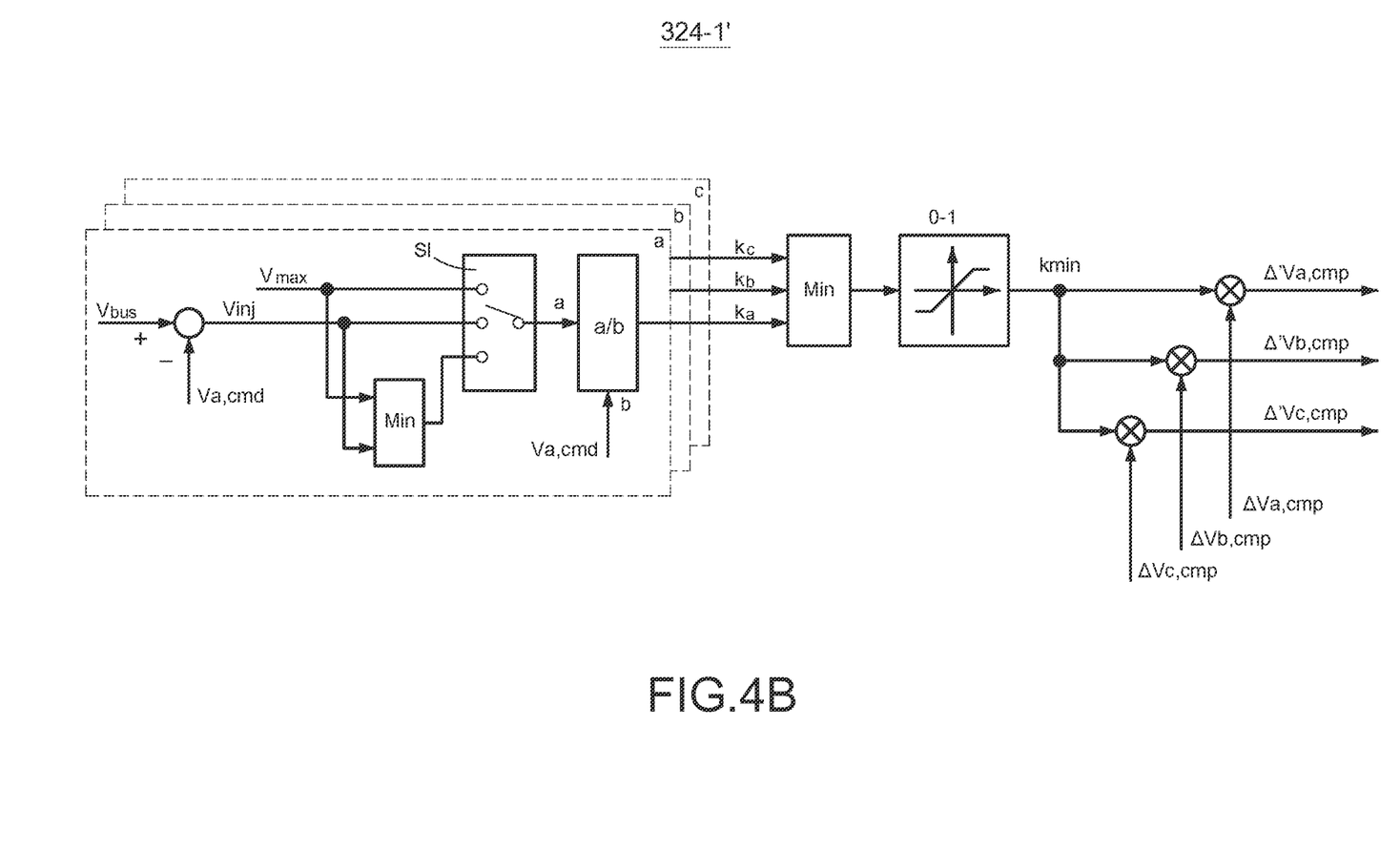
FIG. 4B is a block diagram of the limit unit according to a second embodiment of the present disclosure.

Please refer to FIG. 4B, which shows a block diagram of the limit unit according to a second embodiment of the present disclosure, and also refer to FIG. 2A to FIG. 4A. The difference between the limit unit 324-1' shown in FIG. 4B and the limit unit 324-1 shown in FIG. 3B is that the limit unit 324-1' is suitable for three-phase circuits. The maximum compensation amount Vmax and the injection amount Vinj of each phase will be selectively switched between the maximum amount, the injection mount, and the minimum amount through a selector Si, and then constants ka-kc are acquired by dividing with the corresponding residual compensation amounts ΔVa, cmp-ΔVc, cmp by a divider. This constants ka-kc will pass through a control block Min to take out the minimum value kmin of the three constants ka-kc to multiply the residual compensation amounts ΔVa, cmp-ΔVc, cmp with the minimum value kmin between 0-1 to acquire the compensation amounts Δ'Va, cmp-Δ'Vc, cmp. In one embodiment, FIG. 3B and FIG. 4B show the limiting methods and control blocks of the residual compensation amounts ΔVa, cmp-ΔVc, cmp by the limit unit 324-1, 324-1', which are only an exemplary implementation, not as a limitation of the preset disclosure. Therefore, any limiting method and control block that can limit the residual compensation amounts ΔVa, cmp-ΔVc, cmp to avoid voltage distortion should be included in the scope of the present disclosure. For example, the limit unit may also be set to a fixed and smaller magnification, and the compensation can still be completed, but the difference is only the compensation speed.

Figure 4C:
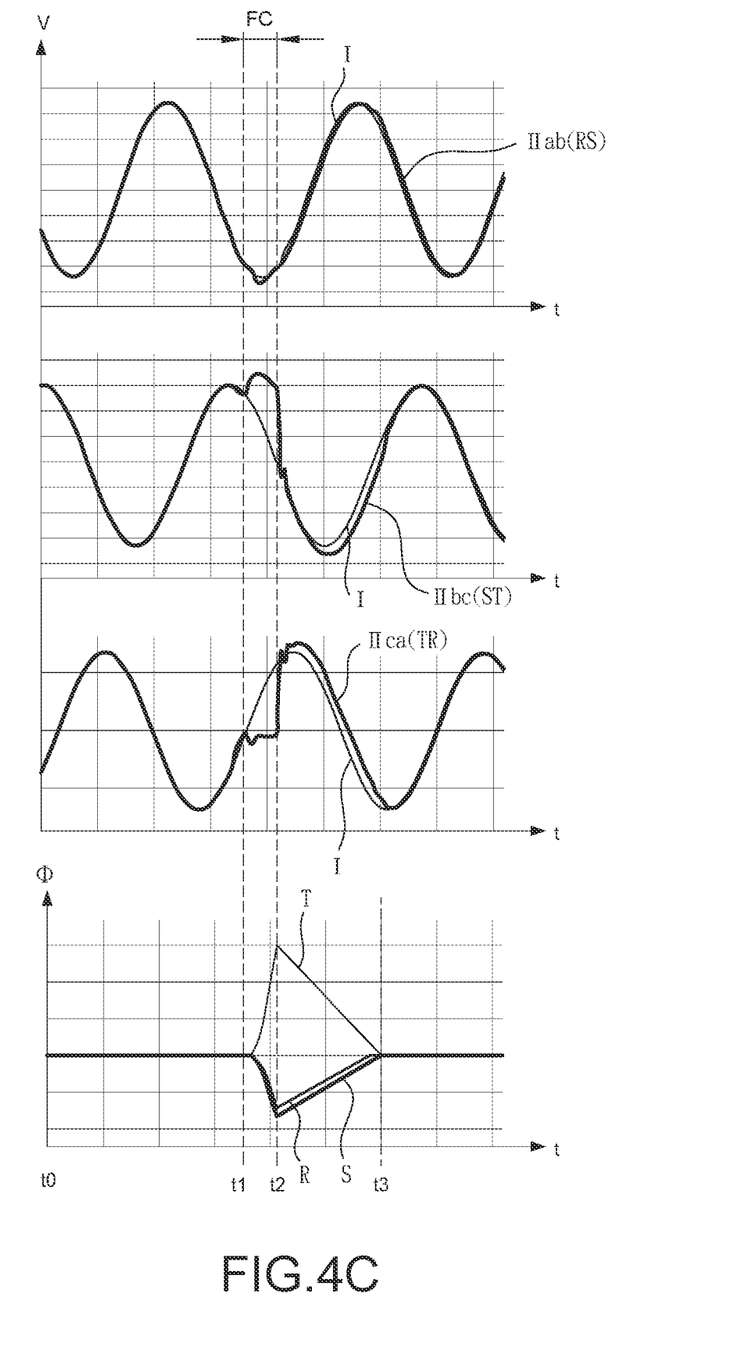
FIG. 4C is a schematic compensation waveform of the uninterruptible power apparatus according to a second embodiment of the present disclosure.

Please refer to FIG. 4C, which shows a schematic compensation waveform of the uninterruptible power apparatus according to a second embodiment of the present disclosure, and also refer to FIG. 2A to FIG. 4B. In this embodiment, the schematic compensation waveform of the three-phase uninterruptible power apparatus 100' is shown. The waveform I is the voltage commands Va, cmd-Vc, cmd, and the waveform is the schematic diagram of the magnetic flux compensation changes of each phase. The waveform II is the voltage waveform detected by the load terminal 100-2, wherein the letters a-c represent R-phase, S-phase, and T-phase, respectively. In one embodiment, the difference between FIG. 4C and FIG. 3C is only the compensation waveform of single-phase circuit or three-phase circuit, so the specific waveform description of the waveform of FIG. 4C may be equivalently inferred by referring to FIG. 3C, and the detail description is omitted here for conciseness.

Figure 5:
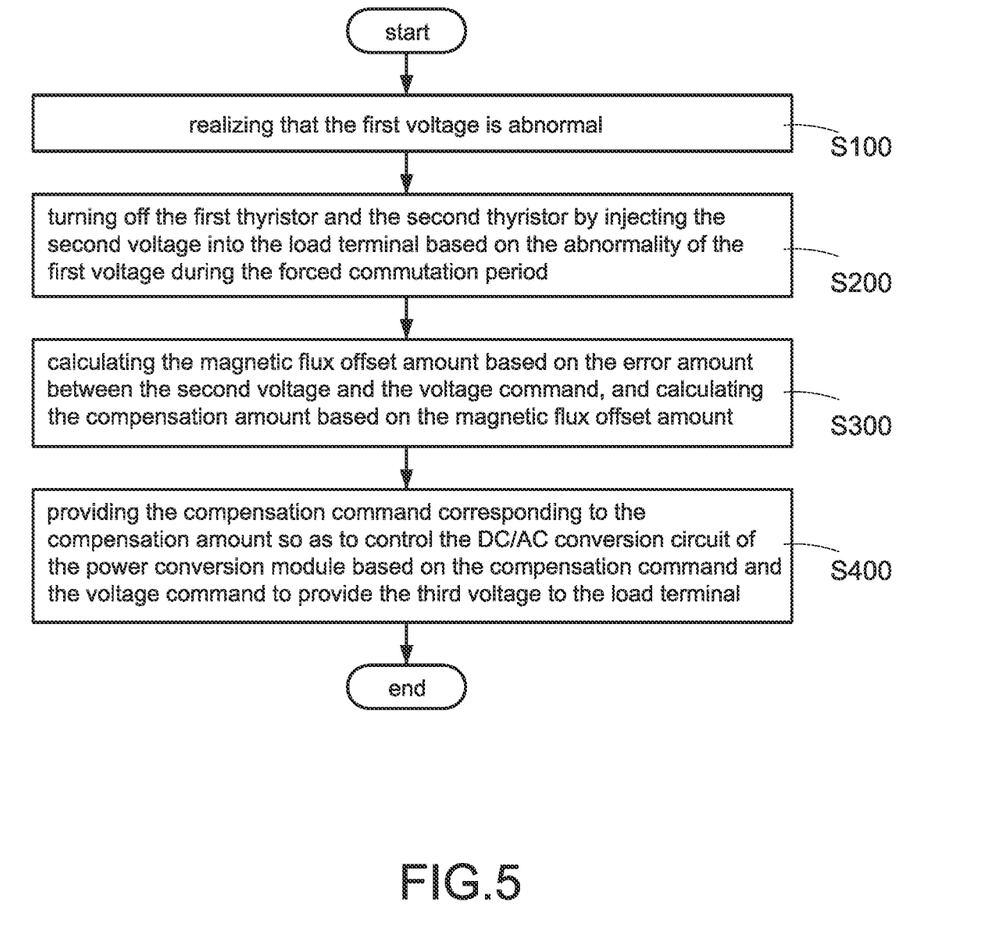
FIG. 5 is a flowchart of a magnetic flux compensation method of the uninterruptible power apparatus according to the present disclosure.

Please refer to FIG. 5, which shows a flowchart of a magnetic flux compensation method of the uninterruptible power apparatus according to the present disclosure, and also refer to FIG. 2A to FIG. 4C. The magnetic flux compensation method of the present disclosure is mainly aimed at compensating for the magnetic flux offset caused by the uninterruptible power apparatus 100 during the forced commutation period FC in order to avoid the phenomenon of unbalanced magnetic flux generated by the transformer inside the rear-stage load 300. The magnetic flux compensation method of the uninterruptible power apparatus 100 includes steps of: realizing that the first voltage is abnormal (S100). The control module 3 determines or realizes whether the first voltage V1 is abnormal or not by detecting the grid terminal 100-1, or by receiving detection signals provided from external devices (not shown). Afterward, turning off the first thyristor 122 and the second thyristor 124 by injecting the second voltage into the load terminal based on the abnormality of the first voltage V1 (S200). The control module 3 ensures that the thyristors are no longer triggered by providing the turned-off signal Soff, and controls the uninterruptible power apparatus 100 to inject the second voltage V2 into the load terminal 100-2 so as to provide a reverse-biased voltage to the unturned-off thyristors for turning off the thyristors. The period during the thyristor turning off is also referred to as the forced commutation period. The second voltage V2 injected into the load terminal 100—2 may be provided by an additional auxiliary circuit (not shown) controlled through the control module 3, or be provided by the DC/AC conversion circuit 26 controlled through the control module 3.

Afterward, calculating the magnetic flux offset amount Vx based on an error amount Er between the second voltage V2 and the voltage command Vx, cmd, and calculating the compensation amount based on the magnetic flux offset amount (S300). A preferred embodiment is to use the control module 3 to calculate the magnetic flux offset amount Vx during the forced commutation period FC based on the error amount Er between the second voltage V2 and the voltage command Vx, cmd. The magnetic flux offset amount Vx is acquired mainly by integrating the error amount Er. Afterward, after the control module 3 acquires the magnetic flux offset amount Vx, the limit unit 324-1 limits the compensation amount to acquire the actual compensation amount (i.e., the compensation amount Δ'Vx, cmp) so as to avoid voltage distortion (that is, the third voltage V3 is distorted) caused by excessive compensation at one time. Finally, providing a compensation command Vcmd corresponding to the compensation amount so as to control the DC/AC conversion circuit 26 of the power conversion module based on the compensation command Vcmd and the voltage command Vx, cmd to provide a third voltage V3 to the load terminal 100-2 (S400). In a preferred embodiment, the control module 3 modulates the control signal Sc based on the compensation command Vcmd and the voltage command Vx, cmd to control the DC/AC conversion circuit 26 to provide the third voltage V3 to the load terminal 100-2 through the control signal Sc. In an embodiment of the present disclosure, the detailed steps of the magnetic flux compensation method of the uninterruptible power apparatus 100 may be referred to FIG. 3A, FIG. 3B, FIG. 4A, and FIG. 4B, and the detail description is omitted here for conciseness.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. An uninterruptible power apparatus, coupled between a power grid and a load, the uninterruptible power apparatus comprising:
 a bypass path, coupled to the power grid through a grid terminal, and coupled to the load through a load terminal, and configured to receive a first voltage through the grid terminal and transmit the first voltage to the load terminal, the bypass path comprising:
  a switch unit, comprising a first thyristor and a second thyristor connected in anti-parallel,
 a power conversion module, comprising:
  an AC/DC conversion circuit, coupled to the grid terminal, and
  a DC/AC conversion circuit, coupled to the AC/DC conversion circuit and the load terminal, and
 a control module, coupled to the DC/AC conversion circuit,
 wherein the time from when the control module detects the abnormality of the first voltage to when both the first thyristor and the second thyristor are turned off is a forced commutation period, and the control module turns off the first thyristor and the second thyristor by injecting a second voltage into the load terminal during the forced commutation period, so as to provide the second voltage as a reverse-biased voltage to the first thyristor or the second thyristor that are not turned off; during the forced commutation period, the control module calculates a magnetic flux offset amount based on an error amount between the second voltage and a voltage command, and provides a compensation command in response to the magnetic flux offset amount; the control module controls the DC/AC conversion circuit to provide a third voltage to the load terminal based on the compensation command and the voltage command.

2. The uninterruptible power apparatus as claimed in claim 1, wherein the control module detects the first voltage and acquires the voltage command corresponding to the first voltage.

3. The uninterruptible power apparatus as claimed in claim 1, wherein the control module comprises:
 a first control module, coupled to the load terminal, and
 a second control module, coupled to the DC/AC conversion circuit and the first control module,
 wherein the first control module provides the compensation command based on the second voltage and the voltage command; the second control module modulates a control signal based on the compensation command and the voltage command, and controls the DC/AC conversion circuit to output the third voltage by the control signal.

4. The uninterruptible power apparatus as claimed in claim 3, wherein the first control module comprises:
 a first control unit, comprising:
  an integral unit, configured to integrate the error amount to acquire the magnetic flux offset amount during the forced commutation period, and
  a filter unit, configured to perform a noise filtering on the magnetic flux offset amount, and
 a second control unit, configured to receive the magnetic flux offset amount.

5. The uninterruptible power apparatus as claimed in claim 4, wherein the DC/AC conversion circuit is a single-phase output circuit, and the second control unit comprises:
 a limit unit,
 wherein the second control unit generates a residual compensation amount based on a difference between the magnetic flux offset amount and a compensation amount, and provides the compensation command based on the compensation amount; the limit unit performs a compensation amount limitation on the residual compensation amount to provide the compensation amount.

6. The uninterruptible power apparatus as claimed in claim 4, wherein the DC/AC conversion circuit is a three-phase output circuit, and the second control unit comprises:
 a zero-sequence balance unit, and
 a limit unit,
 wherein the second control unit generates a residual compensation amount based on a difference between the magnetic flux offset amount and a compensation amount, and provides the compensation command based on the compensation amount; the zero-sequence balance unit performs a zero-sequence component deduction on the residual compensation amount; the limit unit performs a compensation amount limitation on the residual compensation amount to provide the compensation amount.

7. A magnetic flux compensation method of an uninterruptible power apparatus coupled between a power grid and a load, the uninterruptible power apparatus comprising a bypass path and a power conversion module, and the bypass path coupled to the power grid and the load; the bypass path comprising a switch unit, and the switch unit comprising a first thyristor and a second thyristor connected in anti-parallel; the bypass path receiving a first voltage provided by the power grid through a grid terminal, and transmitting the first voltage to a load terminal coupled to the load, the method comprising steps of:
 (a) realizing that the first voltage is abnormal, and the time from realizing the abnormality of the first voltage to turning off both the first thyristor and the second thyristor is a forced commutation period,
 (b) turning off the first thyristor and the second thyristor by injecting a second voltage into the load terminal based on the abnormality of the first voltage during the forced commutation period, so as to provide the second voltage as a reverse-biased voltage to the first thyristor or the second thyristor that are not turned off,
(c) during the forced commutation period, calculating a magnetic flux offset amount based on an error amount between the second voltage and a voltage command, and calculating a compensation amount based on the magnetic flux offset amount, and
(d) providing a compensation command corresponding to the compensation amount so as to control a DC/AC conversion circuit of the power conversion module based on the compensation command and the voltage command to provide a third voltage to the load terminal.

8. The magnetic flux compensation method as claimed in claim 7, further comprising steps of:
   (a00) realizing that the first voltage is normal, and
   (a01) detecting the first voltage to acquire the voltage command corresponding to the first voltage.

9. The magnetic flux compensation method as claimed in claim 7, wherein the step (b) comprises a step of:
   controlling the DC/AC conversion circuit to provide the second voltage during the forced commutation period.

10. The magnetic flux compensation method as claimed in claim 7, wherein the step (d) comprises steps of:
    (d1) modulating a control signal based on the compensation command and the voltage command, and
    (d2) controlling the DC/AC conversion circuit to provide the third voltage by the control signal.

11. The magnetic flux compensation method as claimed in claim 7, wherein the step (c) comprises steps of:
    (c1) integrating the error amount to acquire the magnetic flux offset amount during the forced commutation period, and
    (c2) performing a noise filtering on the magnetic flux offset amount.

12. The magnetic flux compensation method as claimed in claim 7, wherein the DC/AC conversion circuit is a single-phase output circuit, and the step (c) comprises steps of:
    (c31) generating a residual compensation amount based on the magnetic flux offset amount and the compensation amount, and
    (c41) performing a compensation amount limitation on the residual compensation amount to provide the compensation amount.

13. The magnetic flux compensation method as claimed in claim 7, wherein the DC/AC conversion circuit is a three-phase output circuit, and the step (c) comprises steps of:
    (c32) generating a residual compensation amount based on the magnetic flux offset amount and the compensation amount, and
    (c41) performing a zero-sequence component deduction and a compensation amount limitation on the residual compensation amount to provide the compensation amount.

* * * * *